United States Patent
Shinohara et al.

(10) Patent No.: US 12,459,360 B2
(45) Date of Patent: Nov. 4, 2025

(54) DISPLAY SYSTEM

(71) Applicant: OMRON Corporation, Kyoto (JP)

(72) Inventors: Masayuki Shinohara, Kyoto (JP); Yutaka Okayasu, Kyoto (JP); Gouo Kurata, Kyoto (JP); Yuto Mori, Kyoto (JP); Masao Mishina, Kyoto (JP); Norikazu Kitamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 209 days.

(21) Appl. No.: 18/463,245

(22) Filed: Sep. 7, 2023

(65) Prior Publication Data

US 2024/0123823 A1    Apr. 18, 2024

(30) Foreign Application Priority Data

Oct. 14, 2022   (JP) .................. 2022-165179

(51) Int. Cl.
| | | |
|---|---|---|
| *B60K 35/29* | (2024.01) | |
| *B60K 35/10* | (2024.01) | |
| *B60K 35/21* | (2024.01) | |
| *B60K 35/28* | (2024.01) | |
| *B60K 35/60* | (2024.01) | |
| *G09G 3/16* | (2006.01) | |

(52) U.S. Cl.
CPC ............. *B60K 35/29* (2024.01); *B60K 35/10* (2024.01); *B60K 35/213* (2024.01); *B60K 35/28* (2024.01); *B60K 35/60* (2024.01); *G09G 3/16* (2013.01); *G09G 2380/10* (2013.01)

(58) Field of Classification Search
CPC ...... B60K 35/00; B60K 35/10; B60K 35/213; B60K 35/28; B60K 35/60; B60K 35/29; B60K 20/02; G09G 3/16; G09G 2380/10; G09G 3/36; G06F 3/147; B60Q 3/283; B60S 1/0491
See application file for complete search history.

(56) References Cited

U.S. PATENT DOCUMENTS

| | | | | |
|---|---|---|---|---|
| 9,804,755 | B2 * | 10/2017 | Han ........................ | B60K 35/10 |
| 11,828,947 | B2 * | 11/2023 | Park ...................... | B60K 35/285 |
| 2002/0133285 | A1 * | 9/2002 | Hirasago ............ | B60K 31/0008 |
| | | | | 180/170 |
| 2008/0264193 | A1 * | 10/2008 | Dorn ...................... | F16H 59/105 |
| | | | | 74/339 |
| 2015/0370329 | A1 * | 12/2015 | Koyama ............. | G06F 3/03549 |
| | | | | 345/173 |
| 2019/0001968 | A1 * | 1/2019 | Yorifuji .............. | B62D 15/0285 |

FOREIGN PATENT DOCUMENTS

JP    2014125149    7/2014

\* cited by examiner

*Primary Examiner* — Sizo B Vilakazi
(74) *Attorney, Agent, or Firm* — JCIPRNET

(57) ABSTRACT

A display system includes an image display part displaying an image indicating a mode selected in a driving device of a vehicle having a plurality of modes. The image display part displays all images indicating each of the plurality of modes, and displays the image indicating the selected mode to be different in at least one of color, brightness, character format, and size from an image indicating a non-selected mode.

11 Claims, 16 Drawing Sheets

DISPLAY SYSTEM

CROSS-REFERENCE TO RELATED APPLICATIONS

This application claims the priority benefit of Japan Application No. 2022-165179, filed on Oct. 14, 2022. The entirety of the above-mentioned patent application is hereby incorporated by reference herein and made a part of this specification.

BACKGROUND

Technical Field

The disclosure relates to a display system installed inside a vehicle.

Related Art

A system has been known as a conventional technology which is set inside a vehicle and indicates a mode selected in a driving device (for example, a transmission) of the vehicle that has a plurality of modes. For example, Patent Document 1 (Japanese Patent Laid-Open No. 2014-125149) discloses a technology in which a range position of a shift lever that selects an operation mode of a transmission is illuminated with a light source.

However, in the technology described in Patent Document 1, the selected range position is merely illuminated. Thus, there is a demand for a display that makes the selected mode relatively conspicuous or a display that has an excellent design.

SUMMARY

A display system according to one aspect of the disclosure is a display system installed inside a vehicle. The display system includes an image display part that displays an image indicating a mode selected in a driving device of the vehicle that has a plurality of modes. The image display part displays all images indicating each of the plurality of modes, and displays the image indicating the selected mode to be different in at least one of color, brightness, character format, and size from an image indicating a non-selected mode.

A display system according to one aspect of the disclosure is a display system installed inside a vehicle. The display system includes an image display part that displays an image indicating a mode selected in a driving device of the vehicle that has a plurality of modes. The image display part displays an animation indicating an operation direction of the vehicle in the selected mode.

DESCRIPTION OF THE EMBODIMENTS

Figure 1:
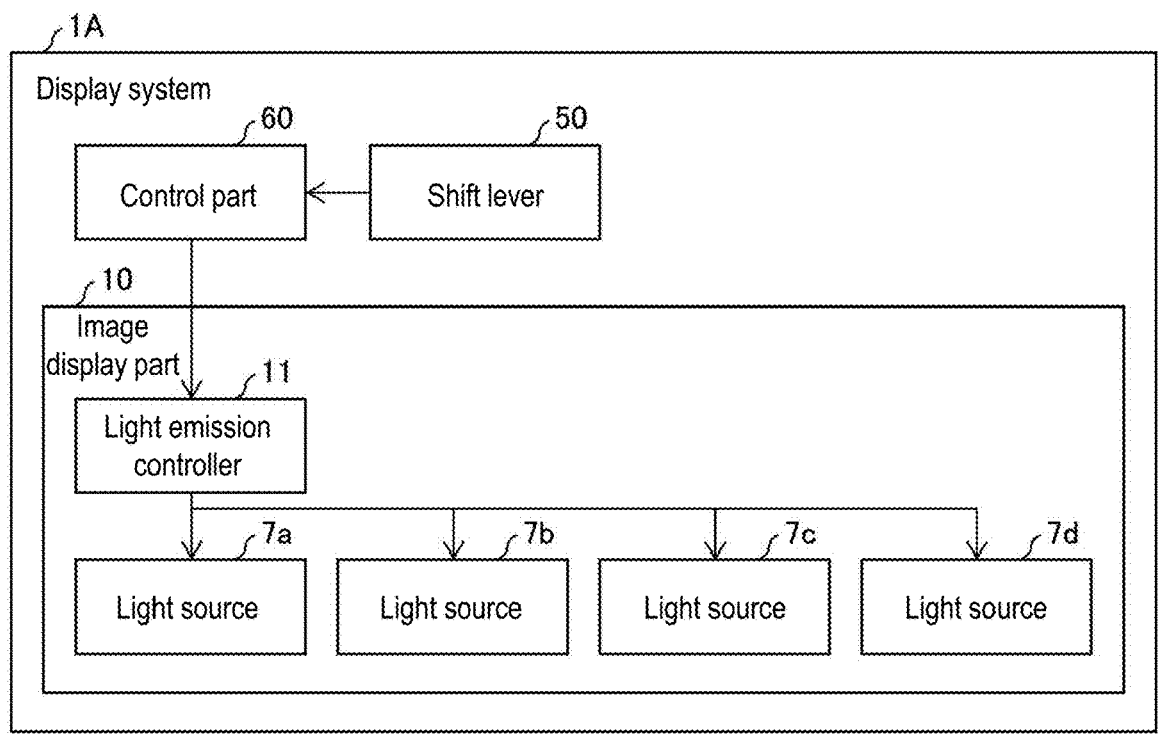
FIG. 1 is a block diagram of a display system according to Embodiment 1 of the disclosure.

One aspect of the disclosure provides a display system that is highly recognizable to a passenger of a vehicle.

A display system according to one aspect of the disclosure is a display system installed inside a vehicle. The display system includes an image display part that displays an image indicating a mode selected in a driving device of the vehicle that has a plurality of modes. The image display part displays all images indicating each of the plurality of modes, and displays the image indicating the selected mode to be different in at least one of color, brightness, character format, and size from an image indicating a non-selected mode.

According to this configuration, the selected mode can be displayed relatively conspicuously.

In the above-mentioned display system, the image display part switches between and displays a plurality of mode display images in response to the selected mode. The mode display images include the image indicating the selected mode and the image indicating the non-selected mode. According to this configuration, it is not only possible to change the image indicating the selected mode in response to the selected mode, but also possible to change a display state of the image indicating the non-selected mode. Thus, by the entirety of the mode display images, it is possible to achieve a design that makes the image of the selected mode conspicuous.

In the above-mentioned display system, the image indicating each of the plurality of modes may include a character indicating the mode. The image display part may be configured to display the character included in the image indicating the selected mode as being larger than the character included in the image indicating the non-selected mode.

In the above-mentioned display system, the image indicating each of the plurality of modes may include a character indicating the mode. The image display part may be configured to display the character included in the image indicating the selected mode as being an outlined character.

In the above-mentioned display system, the image display part may be configured to display, as the image indicating the selected mode, an image including a character and a pattern indicating the selected mode.

In the above-mentioned display system, the image indicating each of the plurality of modes may include a character indicating the mode. The image display part may be configured to display the character included in the image indicating the selected mode as being surrounded by a predetermined figure.

In the above-mentioned display system, the driving device may be a transmission of an engine of the vehicle. The image display part may be provided on a shift lever that controls a mode of the transmission. According to the above-mentioned configuration, by performing display on the shift lever, it is possible to easily recognize a mode when performing visual confirmation during a shift operation. Since the selected mode is displayed in an easy-to-understand manner, operability is improved. Since the selected mode can be displayed with good visibility, a display with sufficiently high visibility becomes possible even in a narrow place such as the shift lever.

In the above-mentioned display system, the image display part may be configured to display, as the image indicating the selected mode, an image including an animation display indicating an operation direction of the vehicle. According to the above-mentioned configuration, the driver of the vehicle is able to intuitively understand in which direction the vehicle is traveling in the mode selected by the shift lever.

In the above-mentioned display system, the driving device may be a wiper of the vehicle. The image display part may be configured to be provided on a wiper switch that controls an operation mode of the wiper. According to the above-mentioned configuration, by performing display on the wiper switch, it is possible to easily recognize a mode when performing visual confirmation during an operation of the wiper switch. Since the selected mode is displayed in an easy-to-understand manner, operability is improved. Since the selected mode can be displayed with good visibility, a display with sufficiently high visibility becomes possible even in a narrow place such as the wiper switch.

A display system according to one aspect of the disclosure is a display system installed inside a vehicle. The display system includes an image display part that displays an image indicating a mode selected in a driving device of the vehicle that has a plurality of modes. The image display part displays an animation indicating an operation direction of the vehicle in the selected mode.

According to the above-mentioned configuration, this allows the driver of the vehicle to intuitively understand a traveling direction of the vehicle in the selected mode of the vehicle.

In the above-mentioned display system, the driving device may be a transmission of an engine of the vehicle. The image display part may be provided on a shift lever that controls a mode of the transmission. According to the above-mentioned configuration, by performing display on the shift lever, it is possible to easily recognize an operation direction of the vehicle when performing visual confirmation during a shift operation. Since the selected mode is displayed in an easy-to-understand manner, operability is improved. Since the selected mode can be displayed with good visibility, a display with sufficiently high visibility becomes possible even in a narrow place such as the shift lever.

In the above-mentioned display system, the image display part may be a display switching device that switches a display image by switching irradiation of light from a plurality of light sources. The display switching device may include: a lens array, in which a plurality of lenses are arranged; and a display part, including a plurality of pixel regions arranged to include a region through which light obtained by condensing each of the light irradiated from the plurality of light sources by each of the lenses of the lens array passes. A transmittance in each of the pixel regions may be configured to be set corresponding to a predetermined stationary pattern.

According to this configuration, an image indicating the selected mode can be displayed without using a complex and costly display device such as a liquid crystal display. Accordingly, the image display part can be realized at low cost.

According to one aspect of the disclosure, a display system can be realized that is highly recognizable to a passenger of a vehicle.

Embodiment 1

An embodiment (hereinafter also written as "the present embodiment") according to one aspect of the disclosure is hereinafter described based on the drawings.

A display system of the disclosure is a display system installed inside a vehicle (for example, a car), and is a system including an image display part that displays, to a passenger of the vehicle, an image indicating a mode (state) of a driving device provided in the vehicle. In the present embodiment, a display system 1A as one aspect of the display system of the disclosure is described.

§ 1 Application Example

Figure 2:
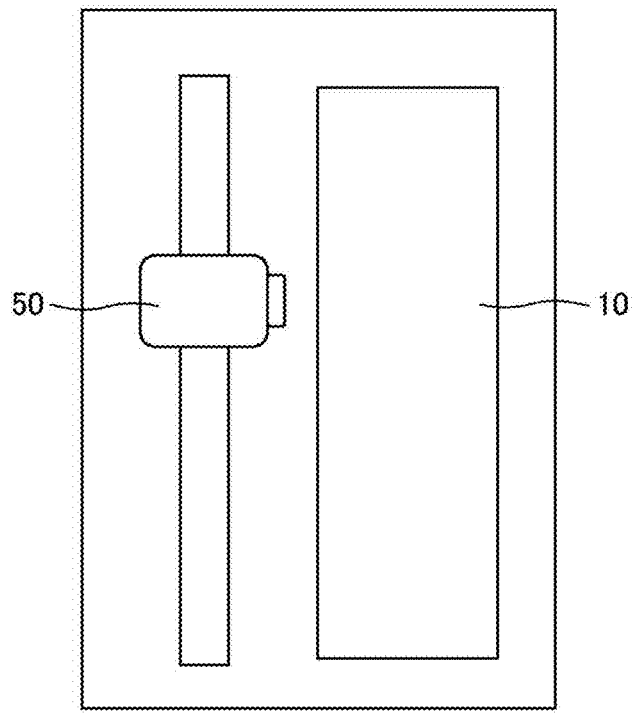
FIG. 2 illustrates an area around a shift lever provided in the above-mentioned display system.
Figure 3:
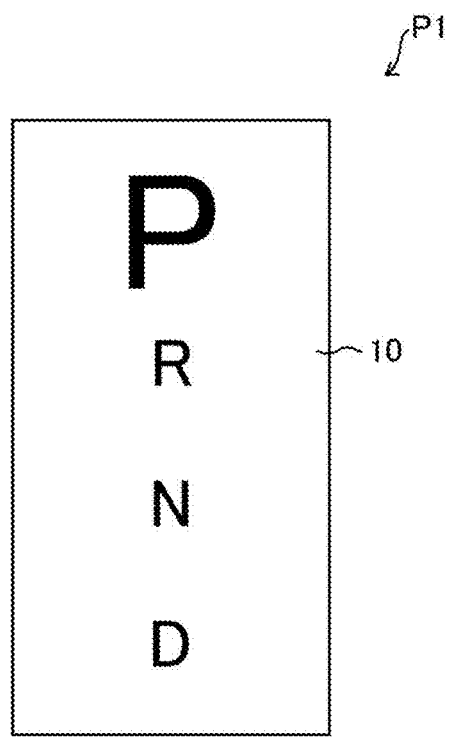
FIG. 3 illustrates an image displayed by an image display part in the case where a driver of a vehicle has moved the shift lever to "P".

First, an example of a situation in which the display system 1A is applied is described using FIG. 1 to FIG. 3. FIG. 1 is a block diagram of the display system 1A. FIG. 2 illustrates an area around a shift lever 50 provided in the display system 1A. As illustrated in FIG. 1 and FIG. 2, the display system 1A includes the shift lever 50, an image display part 10 and a control part 60.

In the display system 1A, an image according to an operation of the shift lever 50 by a driver is displayed by the image display part 10. FIG. 3 illustrates an exemplary display image displayed by the image display part 10. FIG. 3 illustrates an image P1 displayed by the image display part 10 in the case where a driver of a vehicle has moved the shift lever 50 to "P (parking)". In the display system 1A, for example, if the driver has moved the shift lever 50 to "P", the control part 60 causes the image display part 10 to display an image so that: (1) all the characters "P", "R (reverse)", "N (neutral)" and "D (drive)" indicating each of modes of a transmission of an engine of the vehicle are displayed; and (2) the character "P" is displayed larger than the other characters, as illustrated in FIG. 3. That is, the image display part 10 displays an image so that "P", which is the selected mode, is more conspicuous than the other characters. This may allow the driver to easily confirm that the mode selected by the shift lever 50 is "P".

§ 2 Configuration Example

Next, a configuration of the display system 1A is described in detail. As mentioned above, the display system 1A includes the shift lever 50, the image display part 10 and the control part 60.

The shift lever 50 is an operation part operated by the driver to select a desired mode from a plurality of modes provided in the transmission of the engine of the vehicle. In the present embodiment, for simplification, the transmission is described as having four modes, namely, "P", "R", "N", and "D". However, the transmission may have, in addition to the above-mentioned four modes, other modes such as "2 (second)", "L (low)", and "B (brake)".

Figure 4:
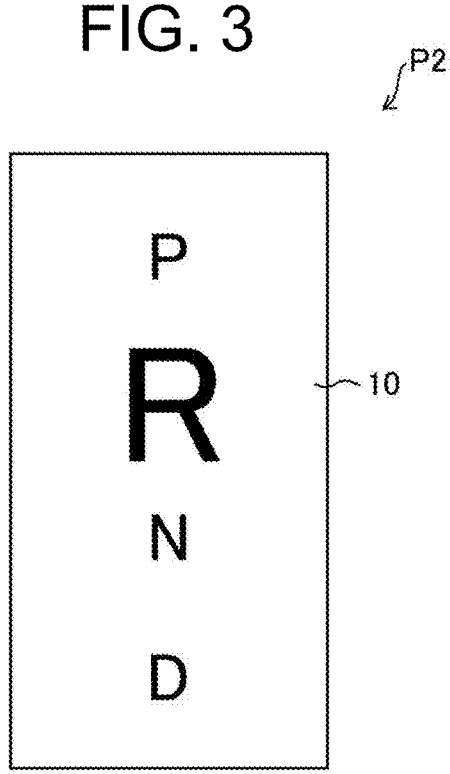
FIG. 4 illustrates an image displayed by the image display part in the case where the driver of the vehicle has moved the shift lever to "R".
Figure 5:
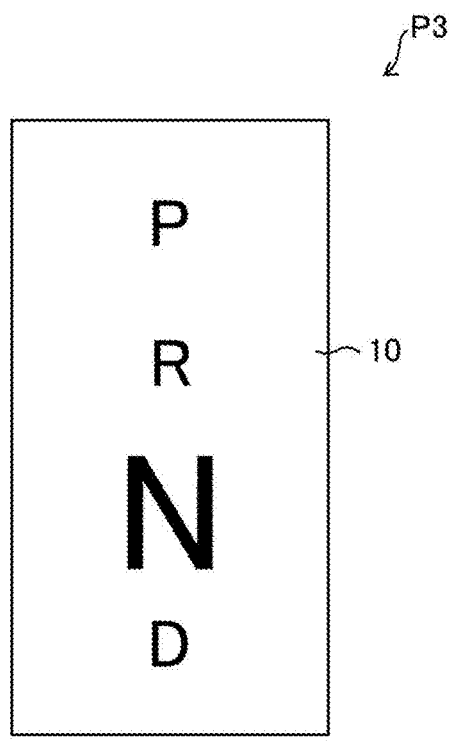
FIG. 5 illustrates an image displayed by the image display part in the case where the driver of the vehicle has moved the shift lever to "N".
Figure 6:
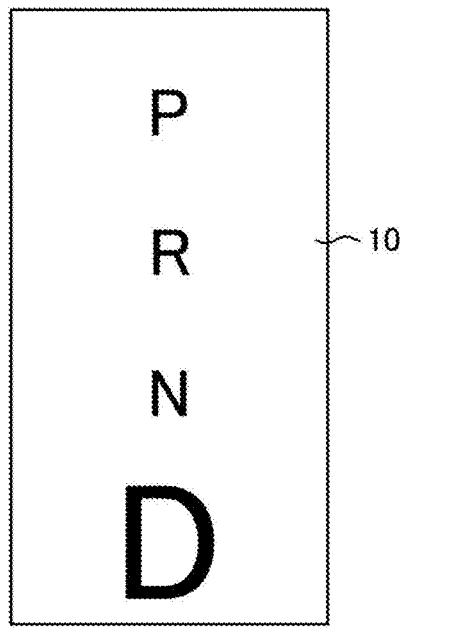
FIG. 6 illustrates an image displayed by the image display part in the case where the driver of the vehicle has moved the shift lever to "D".

As illustrated in FIG. 2, the image display part 10 is installed in a position in the vicinity of the shift lever 50, where the driver of the vehicle is allowed to perform confirmation. The image display part 10 displays an image according to the mode of the transmission selected by the driver. FIG. 4 illustrates an image P2 displayed by the image display part 10 in the case where the driver of the vehicle has moved the shift lever 50 to "R". FIG. 5 illustrates an image P3 displayed by the image display part 10 in the case where the driver of the vehicle has moved the shift lever 50 to "N". FIG. 6 illustrates an image P4 displayed by the image display part 10 in the case where the driver of the vehicle has moved the shift lever 50 to "D". As illustrated in FIG. 3 to FIG. 6, in response to the operation of the shift lever 50 by the driver, the image display part 10: (1) displays all the characters indicating each of the modes of the transmission of the engine of the vehicle; and (2) displays the character indicating the mode of the transmission selected by the driver as being larger than the other characters. This may allow the driver to easily confirm which mode is the mode of the transmission selected by the driver (in other words, the mode selected by the shift lever 50).

The image display part 10 may be realized by a display switching device described in detail below.

(Basic Configuration of Image Display Part)

Figure 7:
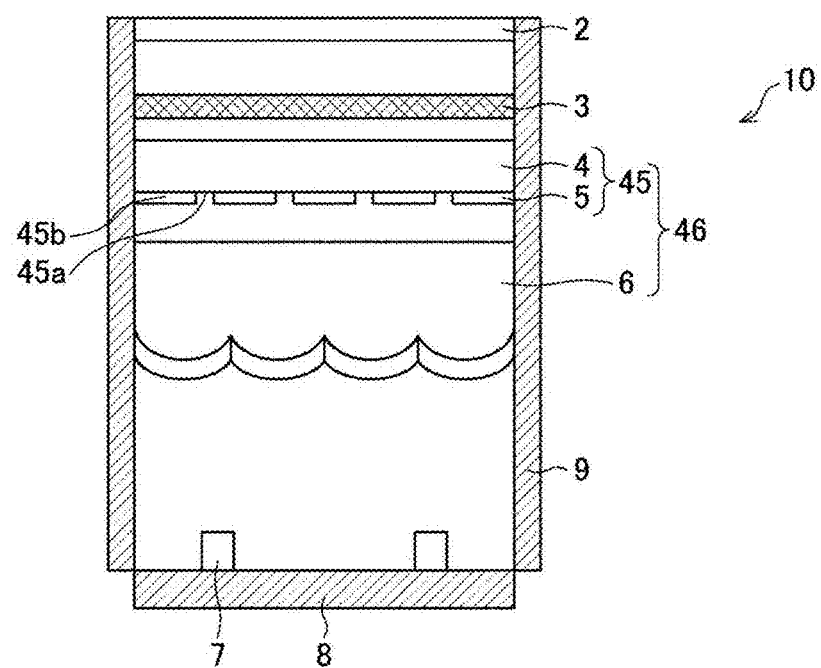
FIG. 7 is a schematic diagram illustrating a basic configuration of the above-mentioned image display part.

FIG. 7 is a schematic diagram illustrating a basic configuration of the image display part 10 according to the present embodiment. As illustrated in FIG. 7, the image display part 10 includes, in order from top to bottom in the figure, a light absorption member 2, a light diffusion member 3, a display condensing part 46, a plurality of light sources 7, and a substrate 8 to which the plurality of light sources 7 are attached.

The light absorption member 2, the light diffusion member 3, a display part 45, and a lens array 6 are supported by a housing 9. Furthermore, the basic configuration of the image display part 10 is achieved by attaching the housing 9 to the substrate 8 to which the plurality of light sources 7 are attached. The image display part 10 may include, above the light absorption member 2, a protective layer for damage prevention. The size of each member described above may be designed as appropriate according to the size of a region where the image display part 10 displays an image.

The light absorption member 2 is a member that absorbs light, and the light diffusion member 3 is a member that diffuses light. That is, the light absorption member 2 and the light diffusion member 3 can be collectively called a light control member. Configuration examples of the light control member include a smoked member, a half mirror, a polarizing plate, a color plate, a diffusion plate, a member displaying a display image, and a smoked member having a diffusion function in combination with a diffusion plate.

The display condensing part 46 includes the display part 45 and the microlens array (hereinafter abbreviated as lens array) 6. The display part 45 includes an image layer 4 and a matrix layer 5, and displays an image (display image) P to be displayed. The matrix layer 5 includes, for example, a pixel region 45$a$ (an opening, hereinafter the same), and a pixel peripheral region 45$b$ (a mask, hereinafter the same) which is a region other than the pixel region 45$a$. The image layer 4 and the matrix layer 5 are joined. The term "pixel peripheral region 45$b$" as used herein refers to a region around each pixel region 45$a$ and having a constant transmittance. The pixel peripheral region 45$b$ shields light from a light source side, that is, light from a side where the lens array 6 is arranged.

As illustrated in FIG. 7, the lens array 6 provided below the display part 45 condenses light emitted from the plurality of light sources 7 attached to the substrate 8. The lens array 6 is configured by arranging a plurality of lenses.

The display part 45 includes a plurality of the pixel regions 45$a$ arranged to include a region through which light obtained by condensing each of the light emitted from positions of the plurality of light sources 7 by each of the lenses of the lens array 6 passes. The transmittance in each of the pixel regions 45$a$ is set corresponding to a predetermined stationary pattern.

The plurality of light sources 7 may be, for example, RGB LEDs.

With the configuration as described above, the image display part 10 is able to switch a display image by switching irradiation of the light from the plurality of light sources 7. The light source 7 is switched between light emission and light extinction by a light emission controller 11, as illustrated in FIG. 1.

Configuration Example of Lens Array

Figure 8:
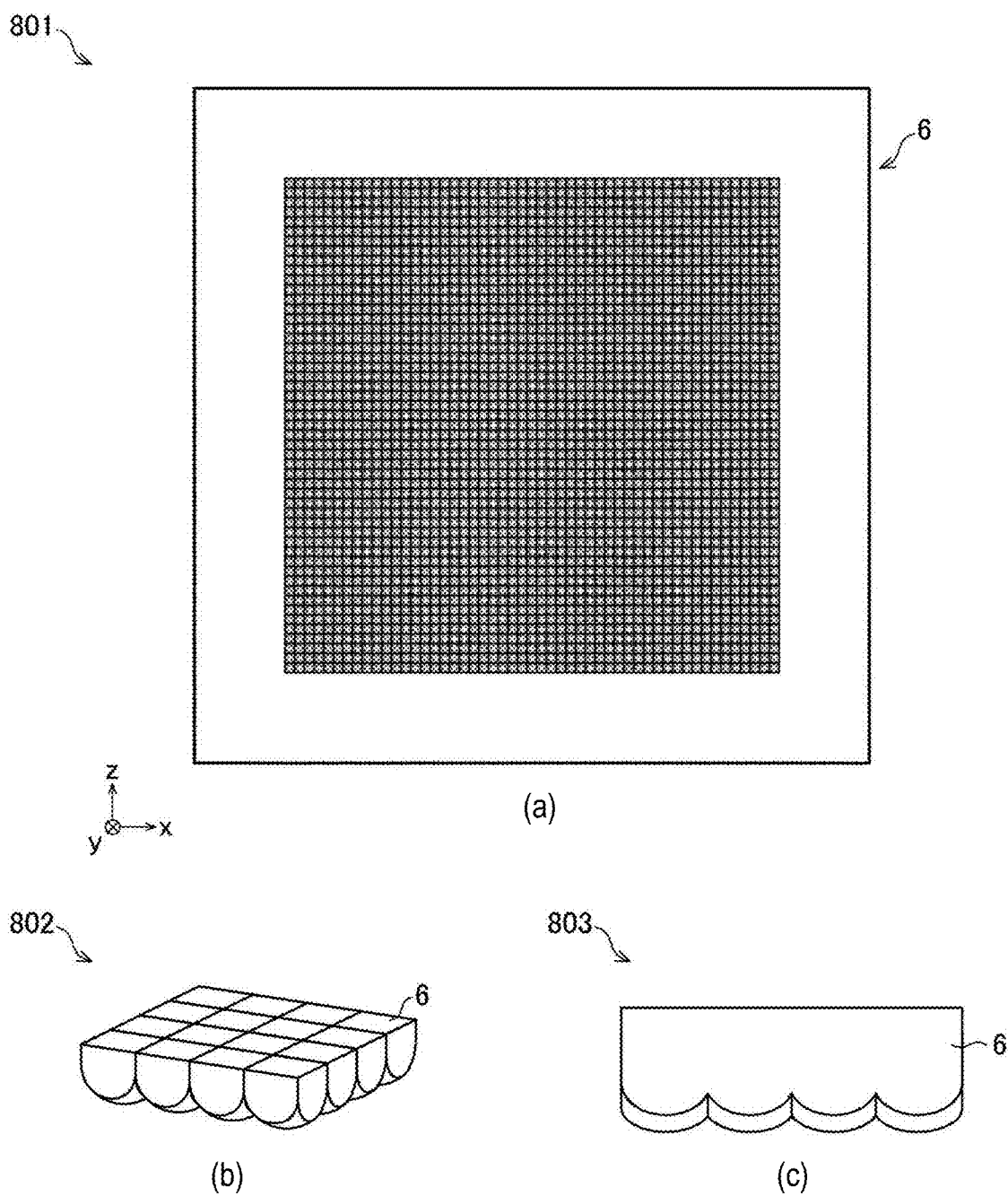
FIG. 8 illustrates, in sub-figures denoted by reference numerals 801, 802, and 803 in (a), (b), and (c), respectively, configuration examples of a lens array provided in the above-mentioned image display part in FIG. 7.

FIG. 8 illustrates, in sub-figures denoted by reference numerals 801, 802, and 803 in (a), (b), and (c), respectively, configuration examples of the lens array 6 in FIG. 7. Specifically, as illustrated in the sub-figure denoted by reference numeral 801 in (a) of FIG. 8, the lens array 6 is configured by arranging a plurality of lenses in a two-dimensional matrix.

Reference numeral 802 in (b) of FIG. 8 illustrates a partially enlarged perspective view of the lens array 6.

Reference numeral 803 in (c) of FIG. 8 illustrates a partially enlarged cross-sectional view of the lens array 6.

Figure 9:
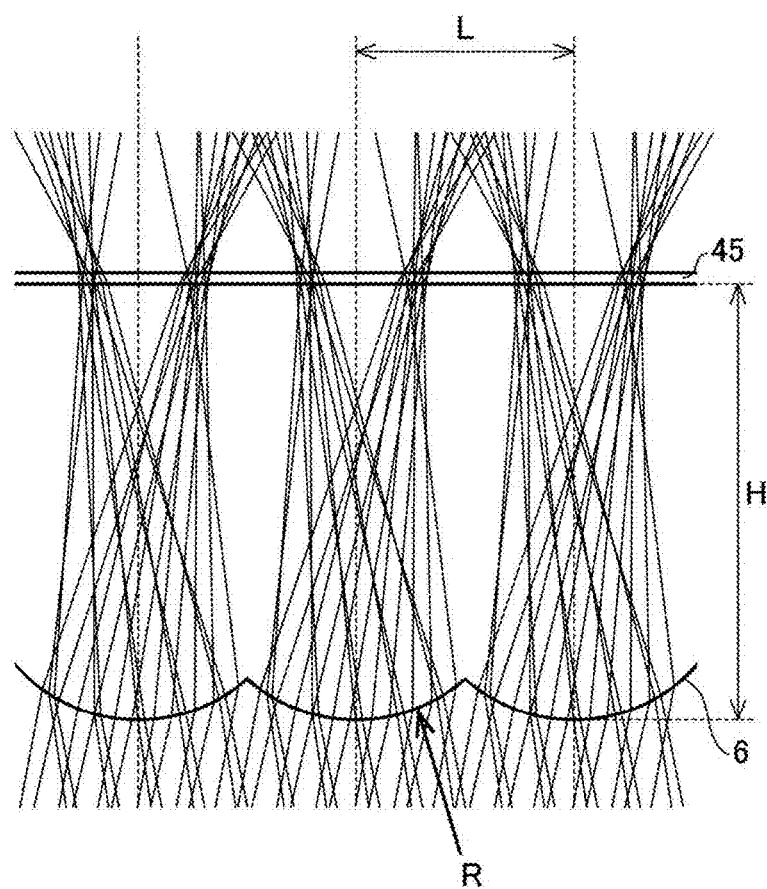
FIG. 9 illustrates an example of a state of light condensing by the above-mentioned lens array.

FIG. 9 illustrates an example of a state of light condensing by the lens array 6. It can be understood from FIG. 9 that a light condensed point can be changed by changing a position of a light source.

Figure 10:
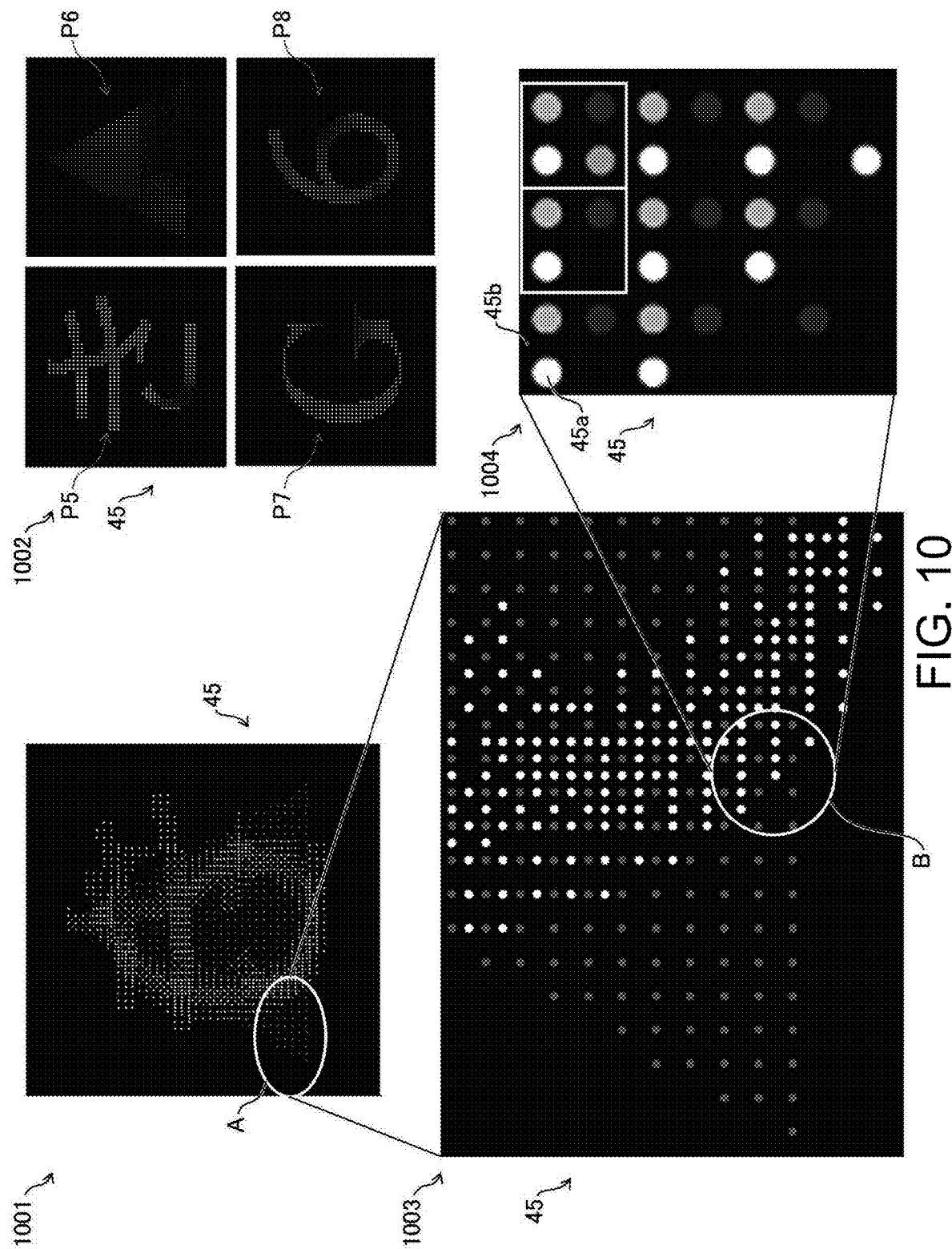
FIG. 10 illustrates, in sub-figures denoted by reference numerals 1001, 1002, 1003, and 1004, respectively, switching display examples of a display part provided in the above-mentioned image display part.

FIG. 10 illustrates, in sub-figures denoted by reference numerals 1001, 1002, 1003, and 1004, respectively, switching display examples of the display part 45. Reference numeral 1001 of FIG. 10 illustrates a display example displayed by the display part 45 (image layer 4), reference numeral 1002 of FIG. 10 illustrates an example of a pattern to be displayed, reference numeral 1003 of FIG. 10 illustrates an enlarged view of part A of the sub-figure denoted by reference numeral 1001, and reference numeral 1004 of FIG. 10 illustrates an enlarged view of part B of the sub-figure denoted by reference numeral 1003.

In the display example illustrated in FIG. 10, for example, an image P5 (hiragana "ki" in the example), an image P6 (pattern "A" in the example), an image P7 (capital letter "G" in the example) and an image P8 (numeral "6" in the example) can be switched and displayed in the same image layer.

As in the sub-figure denoted by reference numeral 1004 in FIG. 10, as an example, it is possible to divide the entire display part 45 into a plurality of areas (pixels) so that one area includes a maximum of four pixel regions 45a, and to switch the display. As in the sub-figure denoted by reference numeral 1004 in FIG. 10, the region other than the pixel region 45a of the display part 45 is the pixel peripheral region 45b.

Figure 11:
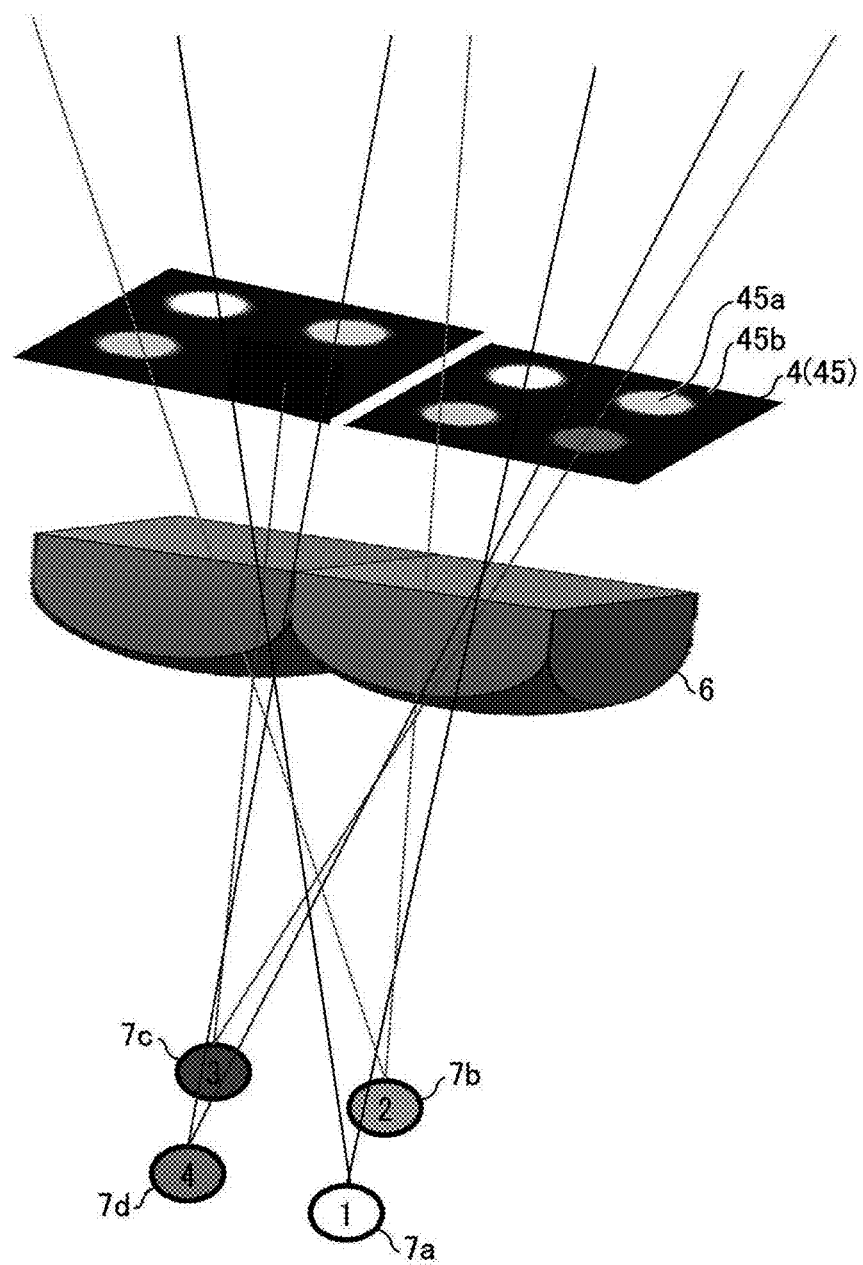
FIG. 11 illustrates a correspondence between the above-mentioned display part, a lens constituting the above-mentioned lens array, and a light source.

FIG. 11 illustrates a correspondence between the display part 45, a lens constituting the lens array 6, and the light source 7. In FIG. 11, two pixels are illustrated as an example, and light from each light source mentioned above is condensed by the lens array 6 and emitted from the corresponding pixel regions 45a. Each pixel of the display part 45 is divided into the pixel region 45a and the pixel peripheral region 45b.

By using the display switching device as described above as the image display part 10, an image indicating the selected mode can be displayed without using a complex and costly display device such as a liquid crystal display. Accordingly, the image display part 10 can be realized at low cost.

The image display part 10 in the present embodiment: (1) displays the image P1 illustrated in FIG. 3 by irradiating light from a light source 7a; (2) displays the image P2 illustrated in FIG. 4 by irradiating light from a light source 7b; (3) displays the image P3 illustrated in FIG. 5 by irradiating light from a light source 7c; and (4) displays the image P4 illustrated in FIG. 6 by irradiating light from a light source 7d. That is, the image display part 10 may switch between and display a plurality of images P1 to P4 (mode display image) according to the mode of the transmission selected by the shift lever 50, and is able to switch between and display the plurality of images P1 to P4 by switching between the light sources 7a to 7d that perform irradiation.

While an aspect in which four images P1 to P4 are switched by the image display part 10 has been described in the present embodiment, by appropriately adjusting the number of divisions of the display part 45 and the number of light sources in accordance with the number of images intended to be displayed, the image display part 10 of the disclosure is able to switch between and display five or more images.

The control part 60 controls an operation of the image display part 10. Specifically, the control part 60 acquires information indicating a position of the shift lever 50 and instructs the image display part 10 to display an image corresponding to the acquired position of the shift lever 50. As an example, if the acquired position of the shift lever 50 is "D", the control part 60 instructs the image display part 10 (more precisely, the light emission controller 11) to display the image P4 illustrated in FIG. 6. When receiving the instruction from the control part 60, the light emission controller 11 controls the light sources 7a to 7d so that only the light source 7d emits light. Accordingly, the image display part 10 displays the image P4 illustrated in FIG. 6. That is, the image display part 10 displays an image so that "D", which is the selected mode, is more conspicuous than the other characters. As a result, the driver is able to easily confirm that the mode selected by the shift lever 50 is "D". That is, the display system 1A of the present embodiment is a display system that is highly recognizable to a passenger of a vehicle.

In the display system 1A in the present embodiment, in response to the mode selected by the shift lever 50, the plurality of images P1 to P4 including an image indicating the selected mode and an image indicating a non-selected mode are switched and displayed. Accordingly, it is not only possible to change the image indicating the selected mode in response to the selected mode, but also possible to change a display state of the image indicating the non-selected mode. Thus, by the entirety of the images P1 to P4, it is possible to achieve a design that makes the image of the selected mode conspicuous.

In the display system 1A of one aspect of the disclosure, the color of the image may be changed for each of the images P1 to P4. Accordingly, not only the image of the selected mode but also the image of the non-selected mode changes color. Thus, visibility of a mode by the color of the entirety of the images P1 to P4 can be improved.

In the display system 1A of one aspect of the disclosure, a display position of the image of the selected mode and the image of the non-selected mode may be changed for each of the images P1 to P4. For example, a spacing between the image of the selected mode and the image of the non-selected mode may be increased, and a spacing between the images of the non-selected modes may be decreased. Accordingly, the image of the selected mode can be made relatively conspicuous.

§ 3 Modifications

The embodiment of the disclosure has been described in detail as above. However, the above description is merely an example of the disclosure in all respects. It goes without saying that various improvements or modifications can be made without departing from the scope of the disclosure. For instance, the following changes are possible. In the following, the same components as those in the above embodiment are denoted by the same reference numerals, and description of the same points as those in the above embodiment are omitted as appropriate. The following modifications may be combined as appropriate.

<3.1>

In the display system 1A in Embodiment 1, by making the character corresponding to the mode selected by the shift lever 50 larger in size than the character corresponding to the non-selected mode, the driver's recognition as to which mode is selected by the shift lever 50 is improved. However, the display system of the disclosure is not limited thereto.

Figure 12:
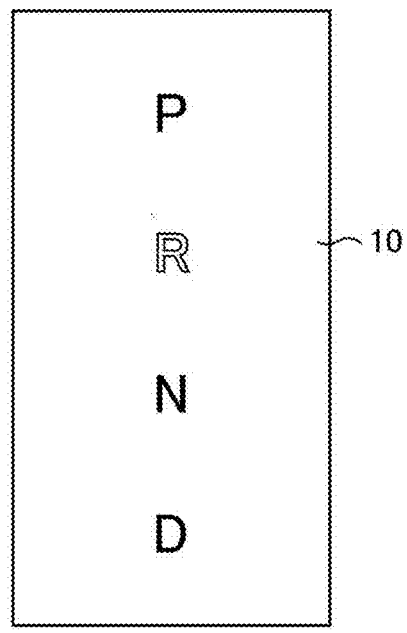
FIG. 12 illustrates a display example of an image displayed by an image display part in a display system as a modification of the display system of Embodiment 1.

In the display system 1A of one aspect of the disclosure, by changing the format of the character indicating the mode of the transmission selected by the driver (for example, displaying the character indicating the mode of the transmission selected by the driver as being an outlined character), the driver's recognition as to which mode is selected by the shift lever 50 may be improved. FIG. 12 illustrates a display example of the image displayed by the image display part 10. As illustrated in FIG. 12, for example, if the driver has moved the shift lever 50 to "R", the image display part 10 may: (1) display all the characters "P", "R", "N" and "D" indicating each of the modes of the transmission of the engine of the vehicle; and (2) display the character "R" as being an outline character.

Figure 13:
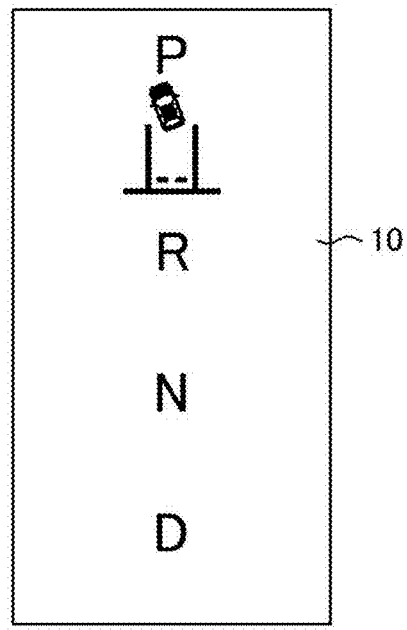
FIG. 13 illustrates another display example of the image displayed by the image display part in the display system as a modification of the display system of Embodiment 1.

In the display system 1A of one aspect of the disclosure, by displaying an image including a character and a pattern as the image indicating the mode of the transmission selected by the driver, the driver's recognition as to which mode is selected by the shift lever 50 may be improved. FIG. 13 illustrates another display example of the image displayed by the image display part 10. As illustrated in FIG. 13, for example, if the driver has moved the shift lever 50 to "P", the image display part 10 may: (1) display all the characters "P", "R", "N" and "D" indicating each of the modes of the transmission of the engine of the vehicle; and (2) display a pattern (pictogram) indicating parking in a region around a region where the character "P" is displayed.

Figure 14:
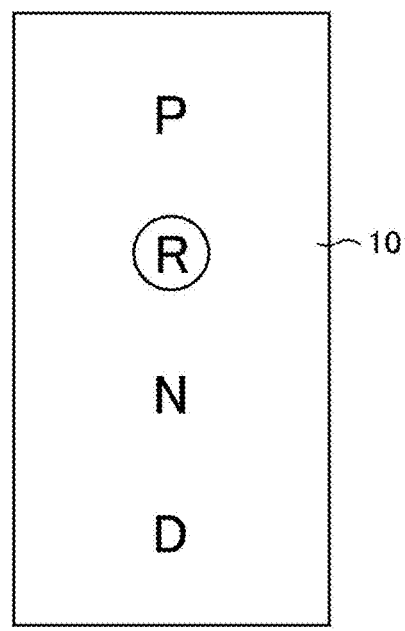
FIG. 14 illustrates still another display example of the image displayed by the image display part in the display system as a modification of the display system of Embodiment 1.

In the display system 1A of one aspect of the disclosure, by displaying a character indicating the mode of the transmission selected by the driver as being surrounded by a predetermined figure, the driver's recognition as to which mode is selected by the shift lever 50 may be improved. FIG. 14 illustrates another display example of the image displayed by the image display part 10. As illustrated in FIG. 14, for example, if the driver has moved the shift lever 50 to "R", the image display part 10 may: (1) display all the characters "P", "R", "N" and "D" indicating each of the modes of the transmission of the engine of the vehicle; and (2) display the character "R" as being surrounded by a predetermined figure (a circle in the example illustrated in FIG. 14).

In the display system 1A of one aspect of the disclosure, by displaying a character corresponding to the mode selected by the shift lever 50 in a different color from a character corresponding to a non-selected mode, the driver's recognition as to which mode is selected by the shift lever 50 may be improved.

In the display system 1A of one aspect of the disclosure, by performing display so that an image corresponding to the mode selected by the shift lever 50 has different brightness from that of an image corresponding to the non-selected mode, the driver's recognition as to which mode is selected by the shift lever 50 may be improved. For example, in the display system 1A of one aspect of the disclosure, the image display part 10 may display an image so that the image corresponding to the mode selected by the shift lever 50 has greater brightness than that of the image corresponding to the non-selected mode.

<3.2>

In Embodiment 1, the display system 1A that displays the image indicating the mode of the transmission as the driving device provided in the vehicle has been described. However, the display system of the disclosure can be applied to other driving devices. In the present modification, an aspect applied to a wiper as the driving device provided in the vehicle is described.

Figure 15:
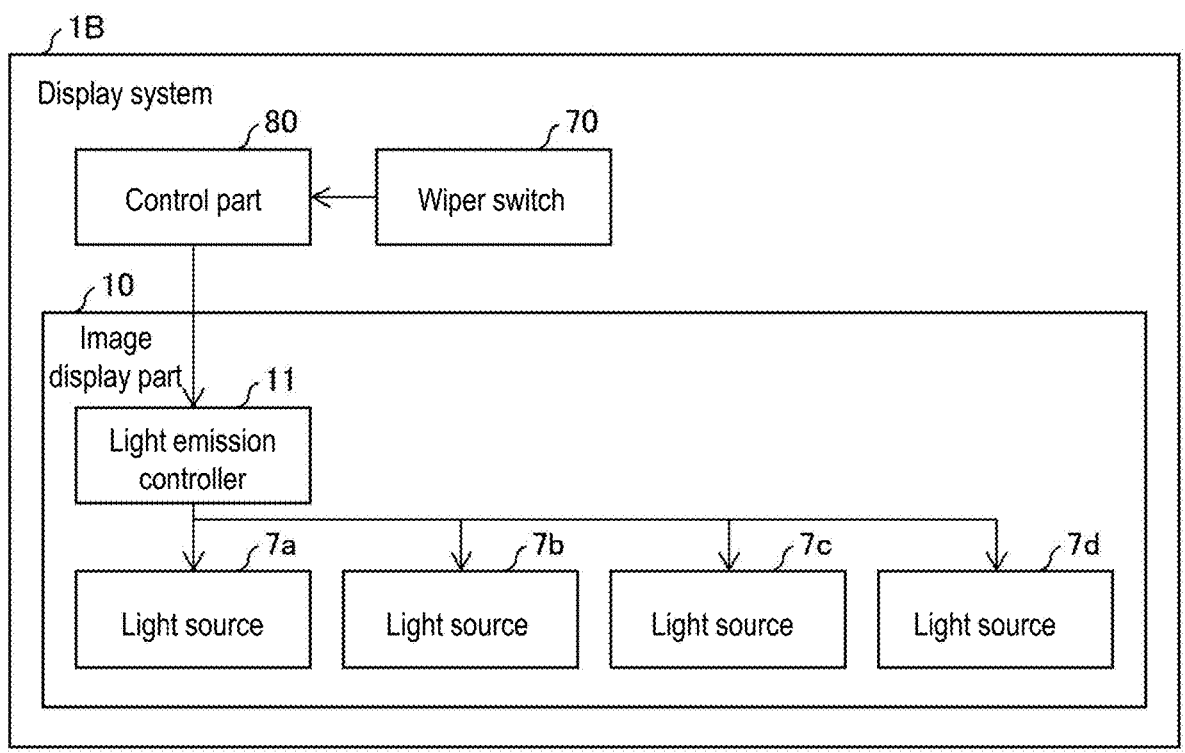
FIG. 15 is a block diagram of a display system as a modification of the display system of Embodiment 1.
Figure 16:
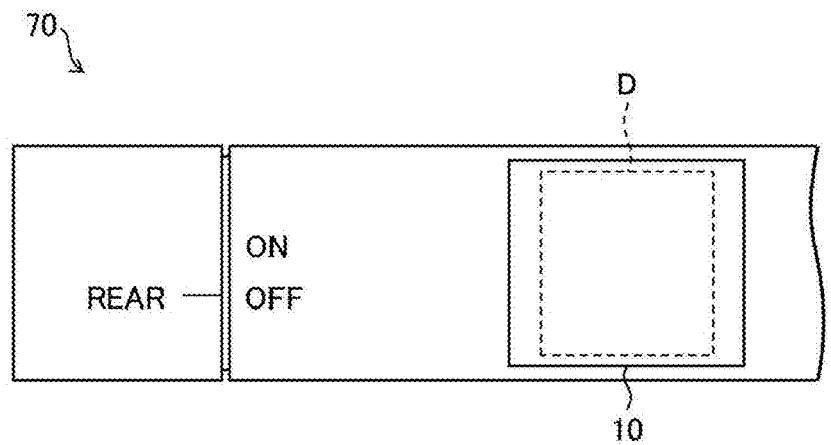
FIG. 16 illustrates a wiper switch provided in the above-mentioned display system.

FIG. 15 is a block diagram of a display system 1B according to the present modification. FIG. 16 illustrates a wiper switch 70 provided in the display system 1B. As illustrated in FIG. 15 and FIG. 16, the display system 1B includes the wiper switch 70, the image display part 10 and a control part 80.

The wiper switch 70 is provided on the back side of a steering wheel of the vehicle for the driver, is an operation part operated by the driver to select a desired operation mode from a plurality of operation modes of a wiper of the vehicle, and has a function of controlling an operation of the wiper. FIG. 16 illustrates the wiper switch 70. As illustrated in FIG. 16, the wiper switch 70 has a region D indicating, among the plurality of operation modes of the wiper (hereinafter simply referred to as wiper) which is provided for a windshield of the vehicle, an operation mode selected by the driver. In the display system 1B in the present modification, in the region D, the image display part 10 displays an image according to an operation of the wiper switch 70 by the driver.

Figure 17:
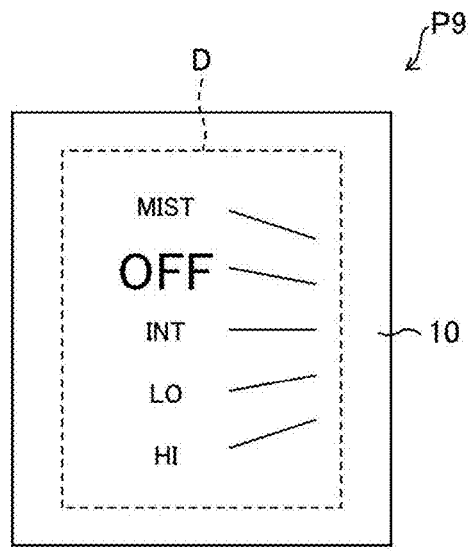
FIG. 17 illustrates an image displayed by the image display part in the case where the driver of the vehicle has moved the wiper switch to "OFF".
Figure 18:
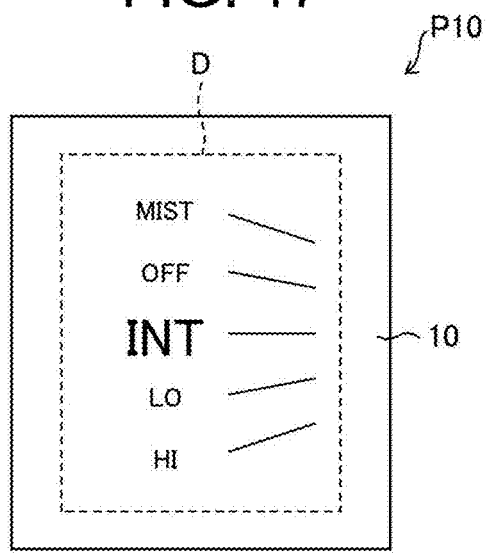
FIG. 18 illustrates an image displayed by the image display part in the case where the driver of the vehicle has moved the wiper switch to "INT".
Figure 19:
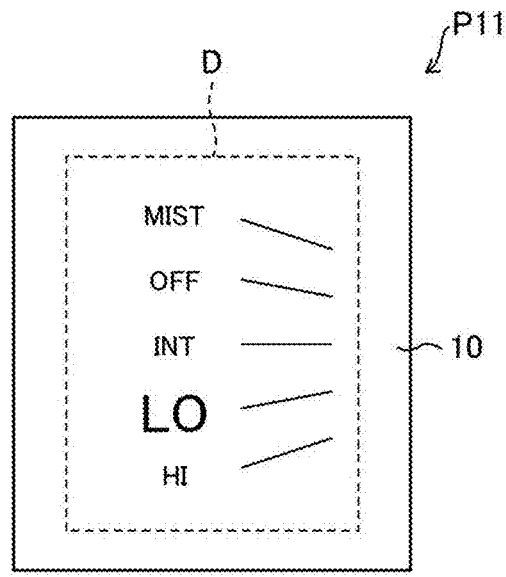
FIG. 19 illustrates an image displayed by the image display part in the case where the driver of the vehicle has moved the wiper switch to "LO".
Figure 20:
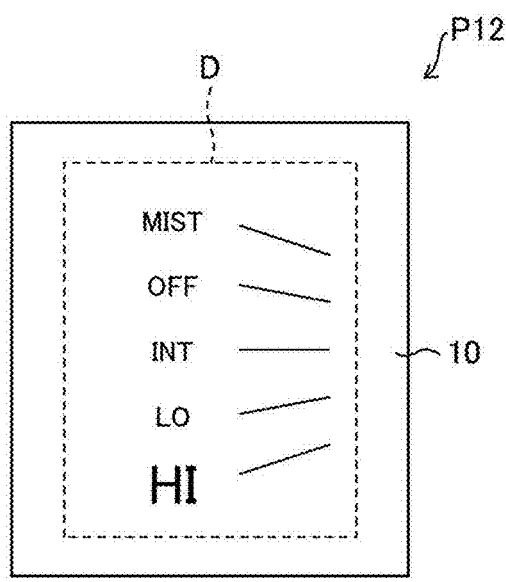
FIG. 20 illustrates an image displayed by the image display part in the case where the driver of the vehicle has moved the wiper switch to "HI".

The image display part 10 is installed on the wiper switch 70, as illustrated in FIG. 16. The image display part 10 displays an image according to the operation mode of the wiper selected by the driver. FIG. 17 illustrates an image P9 displayed by the image display part 10 in the case where the driver of the vehicle has moved the wiper switch 70 to "OFF (stop)". FIG. 18 illustrates an image P10 displayed by the image display part 10 in the case where the driver of the vehicle has moved the wiper switch 70 to "INT (intermittent operation mode)". FIG. 19 illustrates an image P11 displayed by the image display part 10 in the case where the driver of the vehicle has moved the wiper switch 70 to "LO (low speed operation mode)". FIG. 20 illustrates an image P12 displayed by the image display part 10 in the case where the driver of the vehicle has moved the wiper switch 70 to "HI (high speed operation mode)". As illustrated in FIG. 17 to FIG. 20, in the present modification, the image display part 10: (1) displays all the characters indicating each of the operation modes of the wiper of the vehicle; and (2) displays a character indicating the operation mode of the wiper selected by the driver as being larger than the other characters. This may allow the driver to easily confirm which mode is the mode of the wiper selected by the driver (in other words, the mode selected by the wiper switch 70).

The image display part 10 in the present modification: (1) displays the image P9 illustrated in FIG. 17 by irradiating light from the light source 7a; (2) displays the image P10 illustrated in FIG. 18 by irradiating light from the light source 7b; (3) displays the image P11 illustrated in FIG. 19 by irradiating light from the light source 7c; and (4) displays the image P12 illustrated in FIG. 20 by irradiating light from the light source 7d. That is, the image display part 10 may display a plurality of images P9 to P12 including a character larger in size than characters indicating the other modes, and is able to switch between and display the plurality of images P9 to P12 by switching between the light sources 7a to 7d that perform irradiation.

The control part 80 controls an operation of the image display part 10. Specifically, the control part 80 acquires information indicating a position of the wiper switch 70 and instructs the image display part 10 to display an image corresponding to the acquired position of the wiper switch 70. As an example, if the acquired position of the wiper switch 70 is "LO", the control part 80 instructs the image display part 10 (more precisely, the light emission controller 11) to display the image P11 illustrated in FIG. 19. When receiving the instruction from the control part 80, the light emission controller 11 controls the light sources 7a to 7d so that only the light source 7c emits light. Accordingly, the image display part 10 displays the image P11 illustrated in FIG. 19. As a result, the driver is able to easily confirm that the mode selected by the wiper switch 70 is "LO". That is, the display system 1B of the present modification is a display system that is highly recognizable to a passenger of a vehicle.

<3.3>

Conventionally, only a character is displayed to display the image according to the mode of the transmission selected by the driver. In this case, there is a problem that it is difficult for the driver to intuitively understand the traveling direction of the vehicle in the selected mode. In the present modification, a display system is described which is capable of displaying an image that makes it easy for the driver to intuitively understand the traveling direction of the vehicle in the mode.

Figure 21:
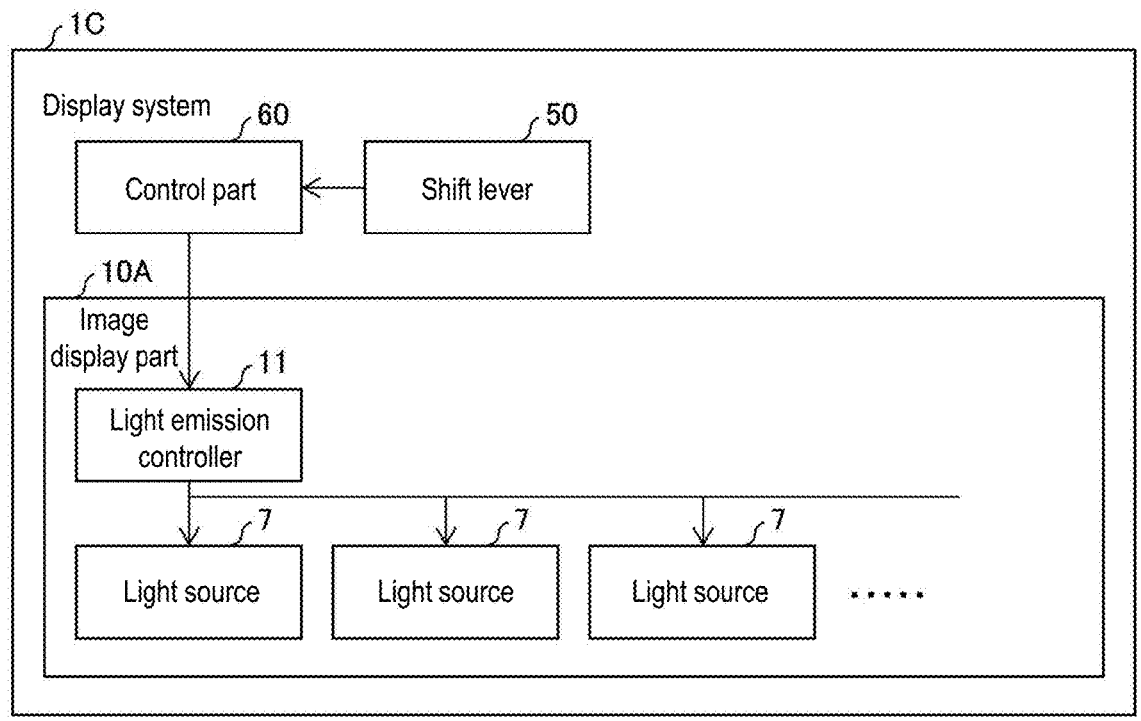
FIG. 21 is a block diagram of a display system as a modification of the display system of Embodiment 1.

FIG. 21 is a block diagram of a display system 1C according to the present modification. As illustrated in FIG. 21, the display system 1C includes an image display part 10A instead of the image display part 10 in Embodiment 1. The image display part 10A includes a plurality of light sources 7, and displays images different from each other by causing each of the light sources to emit light.

In the display system 1C in the present modification, an image displayed by the image display part 10A in the case where the mode of the transmission selected by the driver with the shift lever 50 is "R" or "D" is different from the image in Embodiment 1.

Figure 22:
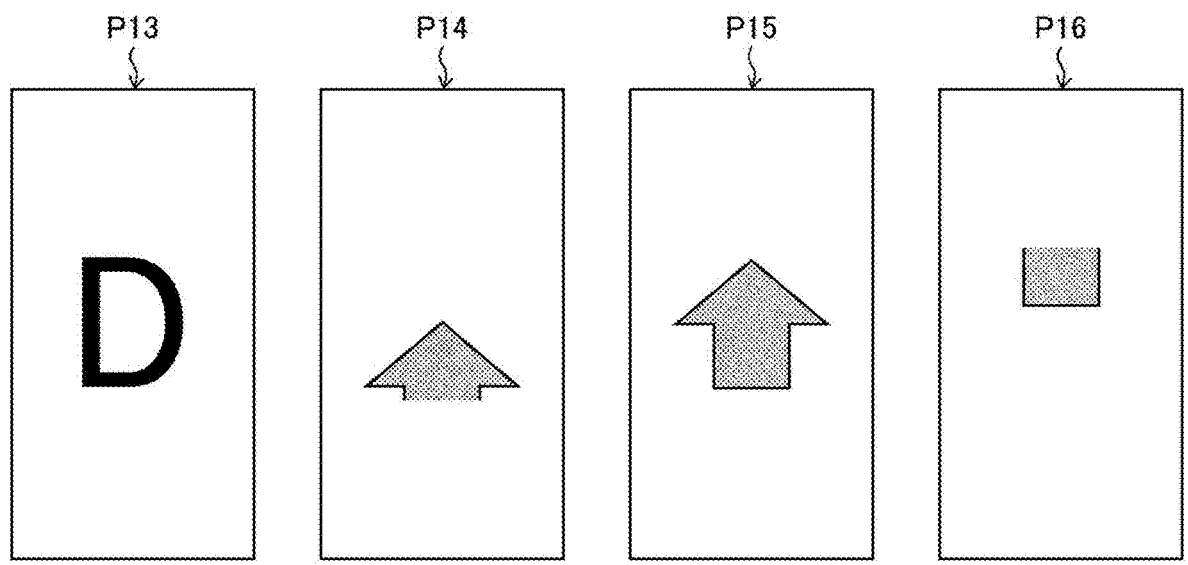
FIG. 22 illustrates an image displayed by an image display part in the above-mentioned display system.
Figure 23:
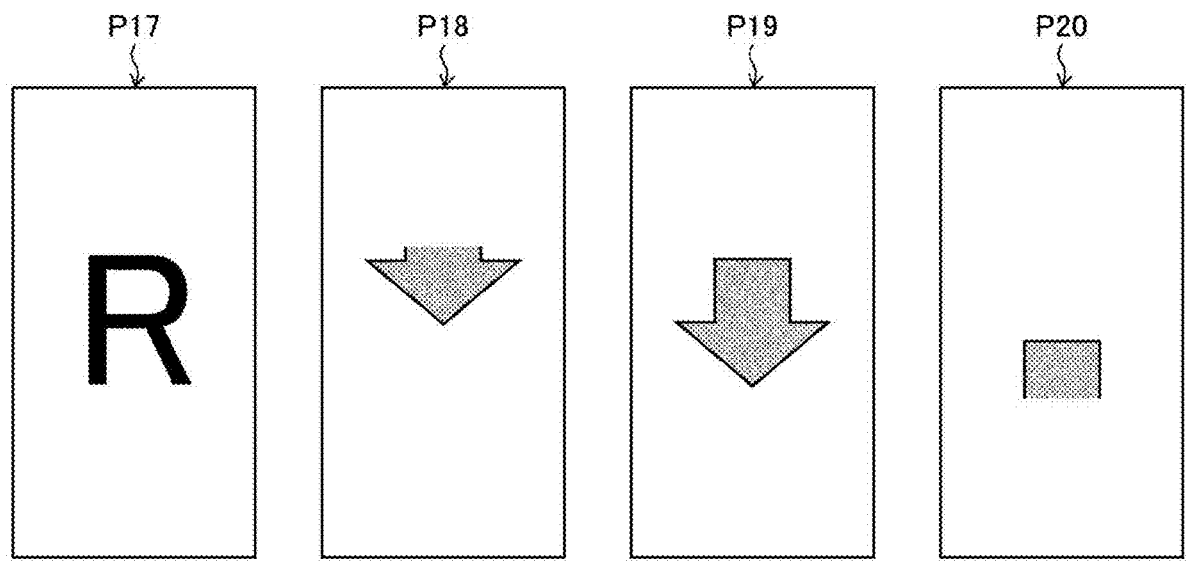
FIG. 23 illustrates still another display example of the image displayed by the image display part.

The image display part 10A in the present modification may display each of images P13 to P16 illustrated in FIG. 22 and images P17 to P20 illustrated in FIG. 23 by causing one of the plurality of light sources 7 to emit light. The image P13 is an image of the character "D". The image P14 is an image of only a front half of an arrow pointing in a forward direction of the vehicle. The image P15 is an image of an arrow pointing in the forward direction of the vehicle. The image P16 is an image of a rectangle. The image P17 is an image of the character "R". The image P18 is an image of only a front half of an arrow pointing in a rearward direction of the vehicle. The image P19 is an image of an arrow pointing in the rearward direction of the vehicle. The image P20 is an image of a rectangle.

If the driver has moved the shift lever 50 to "D", in the display system 1C, the light emission controller 11 of the image display part 10A sequentially turns on the light source 7 corresponding to the image P13, the light source 7 corresponding to the image P14, the light source 7 corresponding to the image P15, and the light source 7 corresponding to the image P16 in this order. Accordingly, the image display part 10A sequentially displays the image P13, the image P14, the image P15, and the image P16. Accordingly, the image display part 10A displays an image as if the arrow were moving forward of the vehicle. This allows the driver of the vehicle to intuitively understand that, in the mode selected by the shift lever 50, the vehicle travels in the forward direction.

If the driver has moved the shift lever 50 to "R", in the display system 1C, the light emission controller 11 of the image display part 10A sequentially turns on the light source 7 corresponding to the image P17, the light source 7 corresponding to the image P18, the light source 7 corresponding to the image P19, and the light source 7 corresponding to the image P20 in this order. Accordingly, the image display part 10A sequentially displays the image P17, the image P18, the image P19, and the image P20. Accordingly, the image display part 10A displays an image as if the arrow were moving rearward of the vehicle. This allows the driver of the vehicle to intuitively understand that, in the mode selected by the shift lever 50, the vehicle travels in the rearward direction.

In this way, in the display system 1C, the image display part 10A displays an animation indicating the traveling direction of the vehicle in the selected mode. This may allow the driver of the vehicle to intuitively understand whether the vehicle travels in the forward direction or rearward direction in the mode selected by the shift lever 50. That is, the display system 1C of the present modification is a display system that is highly recognizable to a passenger of a vehicle.

<3.4>

In the display system 1A of Embodiment 1, the image display part 10 is installed in the vicinity of the shift lever 50. However, the display system of the disclosure is not limited thereto. In the present modification, a configuration is described in which the image display part 10 is provided inside a shift lever, and an image is displayed on an upper surface of the shift lever by the image display part 10.

Figure 24:
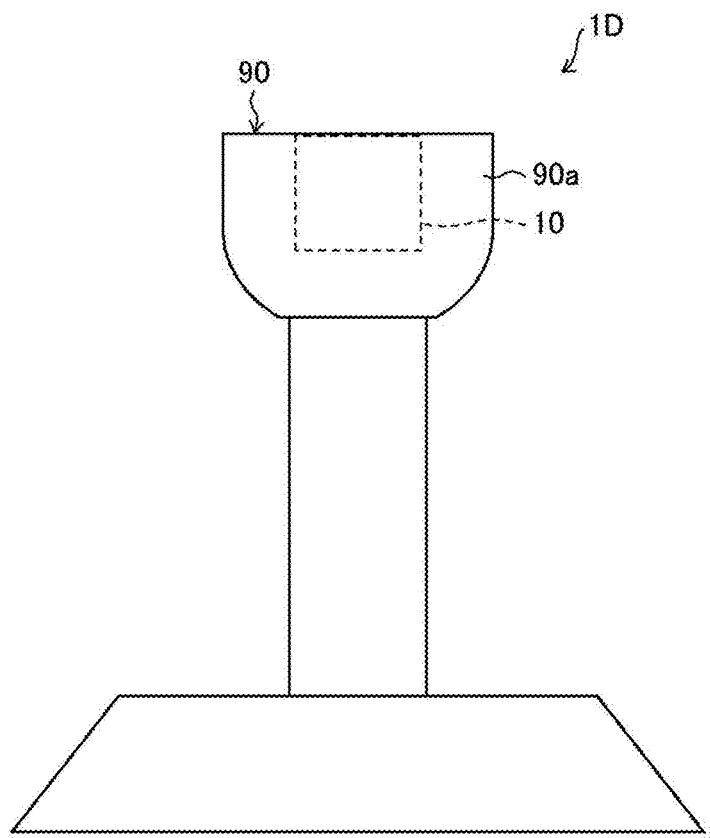
FIG. 24 illustrates a shift lever provided in a display system as a modification of the display system of Embodiment 1.

FIG. 24 illustrates a shift lever 90 provided in a display system 1D in the present modification. As illustrated in FIG. 24, in the display system 1D, the image display part 10 is installed in the shift lever 90, more specifically, in a knob 90a of the shift lever 90. The image display part 10 is installed inside the shift lever 90 so that a surface from which light is emitted is an upper surface of the shift lever 90, and the image display part 10 displays an image on the upper surface of the shift lever 90.

Figure 25:
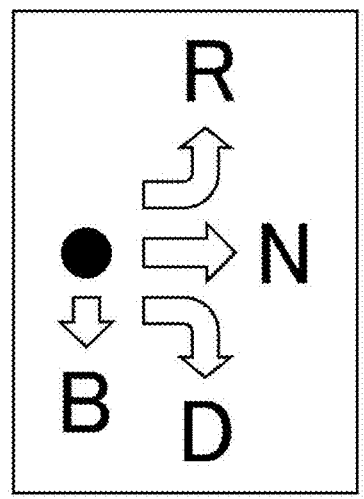
FIG. 25 illustrates an example of a conventional shift lever that has an image indicating a mode of a transmission printed on an upper surface.

FIG. 25 illustrates an example of a conventional shift lever that has an image indicating a mode of a transmission printed on an upper surface. In the conventional shift lever, since the image is printed on the upper surface, the image naturally does not change even if the driver operates the shift lever. Hence, when looking at the shift lever, the driver is unable to recognize which mode is selected by the shift lever. In contrast, in the display system 1D, when looking at the shift lever, the driver is able to recognize which mode is selected by the shift lever.

Figure 26:
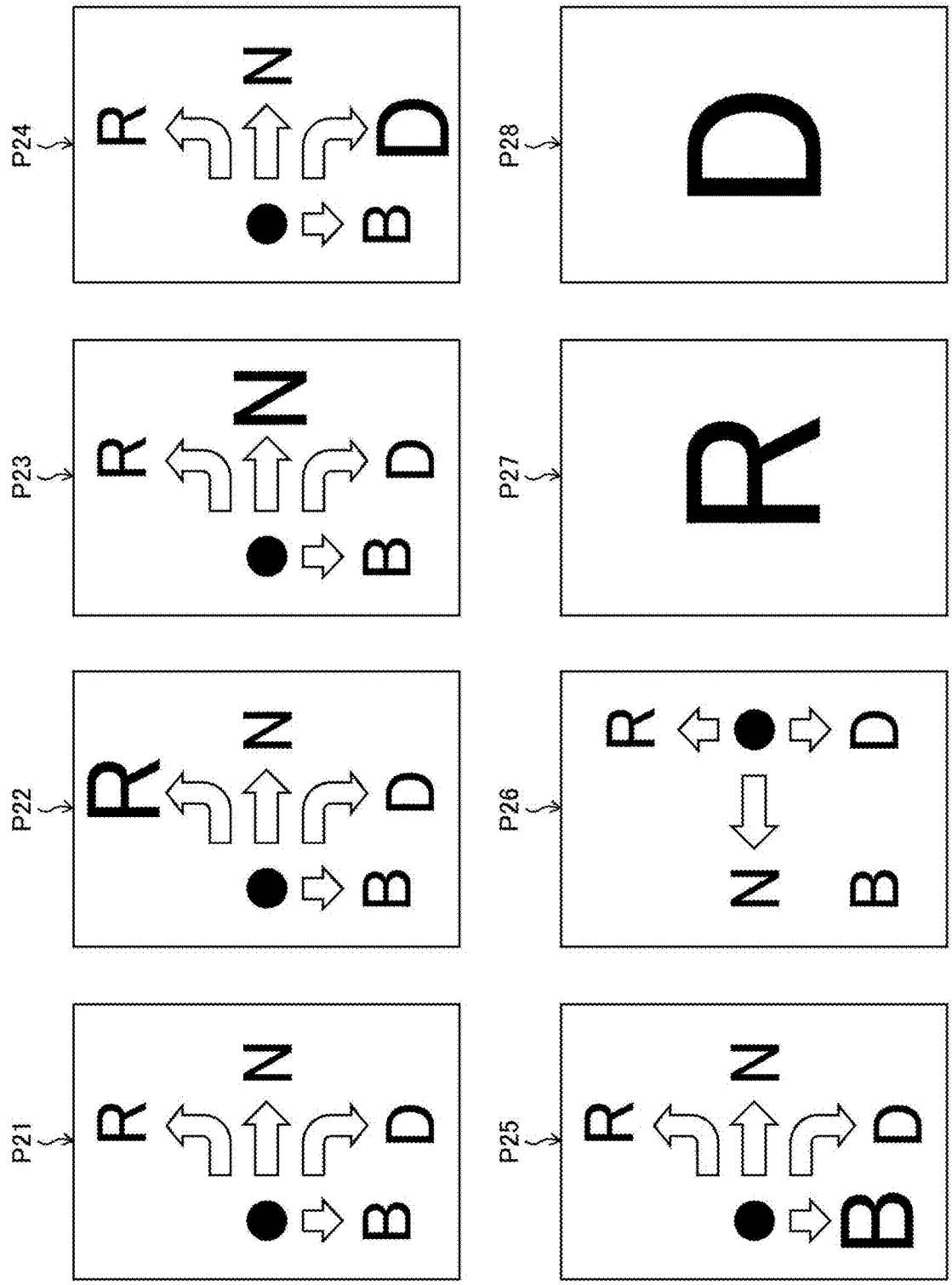
FIG. 26 illustrates an image displayed by an image display part in the above-mentioned display system.

The image display part 10 in the present modification includes a plurality of light sources 7, and displays images different from each other by causing each of the light sources to emit light. The image display part 10 in the present modification may display each of images P21 to P28 illustrated in FIG. 26 by causing one of the plurality of light sources 7 to emit light. The image P21 is an image in which each character is displayed in the same size. The image P22 is an image in which the character "R" is displayed larger than the other characters. The image P23 is an image in which the character "N" is displayed larger than the other characters. The image P24 is an image in which the character "D" is displayed larger than the other characters. The image P25 is an image in which the character "B" is displayed larger than the other characters. The image P26 is an image indicating, when the shift lever 90 has been moved to the right from a neutral position (position indicated by a circle figure), the mode of the transmission selected by the next movement of the shift lever 90. The image P27 is an image of the character "R". The image P28 is an image of the character "D".

Display Example 1

In the display system 1D, in the case where any mode of the transmission is selected by an operation of the shift lever 90 by the driver, an image among the images P22 to P25 that corresponds to the selected mode may be displayed by the image display part 10. That is, in the display system 1D, in the case where any mode of the transmission is selected by the operation of the shift lever 90 by the driver: (1) all the characters indicating each of the modes of the transmission of the engine of the vehicle may be displayed; and (2) the character indicating the mode of the transmission selected by the driver may be displayed larger than the other characters.

For example, in the case where the driver has selected "D" as the mode of the transmission by operating the shift lever 90, the image display part 10 displays the image P24 in which the character "D" is displayed larger than the other characters. As a result, the driver is able to easily confirm that the mode selected by the shift lever 90 is "D".

In the display system 1D, in the case where the driver has selected "D" as the mode of the transmission by operating the shift lever 90: (1) all the characters indicating each of the modes of the transmission of the engine of the vehicle may be displayed; and (2) an animation described above in <3.3> using FIG. 22 may be displayed.

Display Example 2

In the display system 1D, in the case where the driver has moved the shift lever 90 to the right from the neutral position, the image P26 may be displayed by the image display part 10. Accordingly, the mode of the transmission to be selected according to the next operation direction of the shift lever 90 can be displayed to the driver. Accordingly, the possibility of the driver erroneously operating the shift lever 90 can be reduced.

Display Example 3

In the display system 1D, in the case where any mode of the transmission is selected by the operation of the shift lever 90 by the driver, the image P21 and an image including only a character indicating the selected mode may be alternately displayed by the image display part 10.

For example, in the case where the driver has selected "D" as the mode of the transmission by operating the shift lever 90, the image display part 10 may alternately display the image P21 and the image P28. Accordingly, the driver is able to easily confirm that the mode selected by the shift lever 90 is "D".

Here, in the display system 1D in the present modification, the image display part 10 displays an image using the light emitted from the light source 7. Hence, even in a dark environment such as at night, the image is easily recognized by the driver compared to the image printed in the conventional manner. Since the upper surface of the shift lever 90 emits light, the driver is likely to grasp the position of the knob of the shift lever 90.

§ 4 Application Example

In the embodiments described so far, the display system of the disclosure may be applied to a shift lever or a wiper switch. However, the display system of the disclosure can be applied to other driving devices of the vehicle.

For example, the display system of the disclosure can be applied to a system that selects an operation mode of a transmission with a dial.

The display system of the disclosure can be applied to a switch (also called a steering switch) provided on a steering wheel.

The display system of the disclosure can be applied to an operation panel for a rear seat. The operation panel may be, for example, for controlling the air conditioning of the vehicle and selecting an operation of an audio. This allows a passenger in the rear seat to partially control the driving device of the vehicle.

The display system of the disclosure can be applied to a so-called push start switch that controls on/off of a power supply of the engine. In this case, the color of the image displayed may be changed between the case where the engine is off and the driver is braking the vehicle and the case where the engine is off and when the driver is not braking the vehicle.

The display system of the disclosure can be applied to an instrument panel. For example, the display system of the disclosure may be applied to a blinker or an alert display displayed on the instrument panel.

The display system of the disclosure can be applied to a light switch that controls an operation of a headlight of the vehicle.

The display system of the disclosure can be applied to a heater control switch that controls an operation of a heater of the vehicle.

The display system of the disclosure can be applied to a welfare vehicle. Here, known examples of the welfare vehicle include a welfare vehicle that transports a wheelchair in which a person is sitting. In such a welfare vehicle, there are many switches such as: a switch for moving the wheelchair inside the vehicle, such as a vehicle height adjustment switch; a safety belt switch; and a fixing device switch for fixing the wheelchair. Depending on the switch, multiple operations such as "pulling", "pushing", and "long pressing" may be necessary. Hence, there is a problem that it is difficult to know how to operate each switch of the welfare vehicle. By applying the display system of the disclosure to each switch of such a welfare vehicle, an operator of the welfare vehicle is likely to recognize which mode is currently selected, and the risk of malfunction can be reduced.

The disclosure is not limited to each embodiment described above, and may be modified in various ways within the scope of the claims. An embodiment derived from a proper combination of technical means disclosed in respective different embodiments is also encompassed in the technical scope of the disclosure.

CONCLUSION

A display system according to aspect 1 of the disclosure is a display system installed inside a vehicle. The display system includes an image display part that displays an image indicating a mode selected in a driving device of the vehicle that has a plurality of modes. The image display part displays all images indicating each of the plurality of modes, and displays the image indicating the selected mode to be different in at least one of color, brightness, character format, and size from an image indicating a non-selected mode.

A display system according to aspect 2 of the disclosure may have the following configuration. In the above-mentioned aspect 1, the image display part switches between and displays a plurality of mode display images in response to the selected mode. The mode display images include the image indicating the selected mode and the image indicating the non-selected mode.

A display system according to aspect 3 of the disclosure may have the following configuration. In the above-mentioned aspect 1 or 2, the image indicating each of the plurality of modes includes a character indicating the mode. The image display part displays the character included in the image indicating the selected mode as being larger than the character included in the image indicating the non-selected mode.

A display system according to aspect 4 of the disclosure may have the following configuration. In any of the above-mentioned aspects 1 to 3, the image indicating each of the plurality of modes includes a character indicating the mode.

The image display part displays the character included in the image indicating the selected mode as being an outlined character.

A display system according to aspect 5 of the disclosure may have the following configuration. In any of the above-mentioned aspects 1 to 4, the image display part displays, as the image indicating the selected mode, an image including a character and a pattern indicating the selected mode.

A display system according to aspect 6 of the disclosure may have the following configuration. In any of the above-mentioned aspects 1 to 5, the image indicating each of the plurality of modes includes a character indicating the mode. The image display part displays the character included in the image indicating the selected mode as being surrounded by a predetermined figure.

A display system according to aspect 7 of the disclosure may have the following configuration. In any of the above-mentioned aspects 1 to 6, the driving device is a transmission of an engine of the vehicle. The image display part is provided on a shift lever that controls a mode of the transmission.

A display system according to aspect 8 of the disclosure may have the following configuration. In any of the above-mentioned aspects 1 to 7, the image display part displays, as the image indicating the selected mode, an image including an animation display indicating an operation direction of the vehicle.

A display system according to aspect 9 of the disclosure may have the following configuration. In any of the above-mentioned aspects 1 to 6, the driving device is a wiper of the vehicle. The image display part is provided on a wiper switch that controls an operation mode of the wiper.

A display system according to aspect 10 of the disclosure is a display system installed inside a vehicle. The display system includes an image display part that displays an image indicating a mode selected in a driving device of the vehicle that has a plurality of modes. The image display part displays an animation indicating an operation direction of the vehicle in the selected mode.

A display system according to aspect 11 of the disclosure may have the following configuration. In the above-mentioned aspect 10, the driving device is a transmission of an engine of the vehicle. The image display part is provided on a shift lever that controls a mode of the transmission.

A display system according to aspect 12 of the disclosure may have the following configuration. In any of the above-mentioned aspects 1 to 11, the image display part is a display switching device that switches a display image by switching irradiation of light from a plurality of light sources. The display switching device includes: a lens array, in which a plurality of lenses are arranged; and a display part, including a plurality of pixel regions arranged to include a region through which light obtained by condensing each of the light irradiated from the plurality of light sources by each of the lenses of the lens array passes. A transmittance in each of the pixel regions is set corresponding to a predetermined stationary pattern.

What is claimed is:

1. A display system, installed inside a vehicle and comprising:
   an image display part, displaying an image indicating a mode selected in a driving device of the vehicle that has a plurality of modes, wherein
   the image display part displays all images indicating each of the plurality of modes, and displays the image indicating the selected mode to be different in at least one of color, brightness, character format, and size from an image indicating a non-selected mode, wherein
   the image indicating each of the plurality of modes comprises a character indicating the mode; and
   the image display part displays the character comprised in the image indicating the selected mode as being larger than the character comprised in the image indicating the non-selected mode.

2. The display system according to claim 1, wherein
   the image display part switches between and displays a plurality of mode display images in response to the selected mode, and
   the mode display images comprise the image indicating the selected mode and the image indicating the non-selected mode.

3. The display system according to claim 1, wherein
   the image indicating each of the plurality of modes comprises a character indicating the mode; and
   the image display part displays the character comprised in the image indicating the selected mode as being an outlined character.

4. The display system according to claim 1, wherein
   the image display part displays, as the image indicating the selected mode, an image comprising a character and a pattern indicating the selected mode.

5. The display system according to claim 1, wherein
   the image indicating each of the plurality of modes comprises a character indicating the mode; and
   the image display part displays the character comprised in the image indicating the selected mode as being surrounded by a predetermined figure.

6. A display system, installed inside a vehicle and comprising:
   an image display part, displaying an image indicating a mode selected in a driving device of the vehicle that has a plurality of modes, wherein
   the image display part displays all images indicating each of the plurality of modes, and displays the image indicating the selected mode to be different in at least one of color, brightness, character format, and size from an image indicating a non-selected mode, wherein
   the driving device is a transmission of an engine of the vehicle; and
   the image display part is provided on a shift lever that controls a mode of the transmission, wherein
   the image display part displays, as the image indicating the selected mode, an image comprising an animation display indicating an operation direction of the vehicle.

7. A display system, installed inside a vehicle and comprising:
   an image display part, displaying an image indicating a mode selected in a driving device of the vehicle that has a plurality of modes, wherein
   the image display part displays all images indicating each of the plurality of modes, and displays the image indicating the selected mode to be different in at least one of color, brightness, character format, and size from an image indicating a non-selected mode, wherein
   the driving device is a wiper of the vehicle; and
   the image display part is provided on a wiper switch that controls an operation mode of the wiper.

8. The display system according to claim 1, wherein
   the image display part is a display switching device that switches a display image by switching irradiation of light from a plurality of light sources; and the display switching device comprises:

a lens array, in which a plurality of lenses are arranged; and a display part, comprising a plurality of pixel regions arranged to comprise a region through which light obtained by condensing each of the light irradiated from the plurality of light sources by each of the lenses of the lens array passes; and a transmittance in each of the pixel regions is set corresponding to a predetermined stationary pattern.

9. A display system, installed inside a vehicle and comprising:

an image display part, displaying an image indicating a mode selected in a driving device of the vehicle that has a plurality of modes, wherein the image display part displays an animation indicating an operation direction of the vehicle in the selected mode.

10. The display system according to claim 9, wherein the driving device is a transmission of an engine of the vehicle; and the image display part is provided on a shift lever that controls a mode of the transmission.

11. The display system according to claim 9, wherein the image display part is a display switching device that switches a display image by switching irradiation of light from a plurality of light sources; and the display switching device comprises:

a lens array, in which a plurality of lenses are arranged; and a display part, comprising a plurality of pixel regions arranged to comprise a region through which light obtained by condensing each of the light irradiated from the plurality of light sources by each of the lenses of the lens array passes; and a transmittance in each of the pixel regions is set corresponding to a predetermined stationary pattern.

* * * * *